Fig. 1.

INVENTOR.
JOHN M. CHAMBERS

Fig. 2

July 28, 1953 J. M. CHAMBERS 2,647,078
ALCOHOL DISTILLATION PROCESS
Filed Dec. 17, 1949 7 Sheets-Sheet 6

Fig. 6.

INVENTOR.
JOHN M. CHAMBERS
BY
ATTORNEYS

UNITED STATES PATENT OFFICE 2,647,078

ALCOHOL DISTILLATION PROCESS

John M. Chambers, Winchester, Mass., assignor, by mesne assignments, to Stone & Webster Engineering Corporation, Boston, Mass., a corporation of Massachusetts Application December 17, 1949, Serial No. 133,598

6 Claims. (Cl. 202—39.5)

This invention relates to a process for purifying fermentation alcohol stocks and essentially includes an extractive distillation step and an ethanol rectifying or concentrating step, carried out under critical conditions as will be described hereinafter, for producing extremely high purity spirit ethanol having an organic impurities content of less than one gram per 100 liters. The invention also includes a distillation process including these steps, for producing a unique distillation product such as whisky and alcoholic beverages other than neutral spirits product which is free of materials which are harsh, bad tasting or bad smelling.

An important feature of the invention is the provision for accurate control of critical process features to insure the obtention of a product of uniform quality. Such control is a serious problem in any extractive distillation process, and is exceptionally complicated for fermentation alcohol stocks in view of the large number and wide variety of the impurities therein.

In the extractive distillation step, the feed is introduced at an intermediate point in a distillation column, dilution water is introduced at the top of the column, and heat is supplied at the bottom of the column. During the distillation process, vapors rise, and the vapors which rise above the feed plate are continually met and scrubbed by the water descending from above, so that ethanol is absorbed therefrom by the water and carried downwardly, and impurities, having much less affinity for water, increase in concentration in the ascending vapor from each successive plate. The concentration of the impurities in the vapor which leaves the top of the column is dependent upon the operating conditions and approaches the azeotropic concentration thereof with water as a maximum. These vapors are condensed, and in the case of materials which are only partially miscible with water, the condensate may separate into two liquid layers. The extractive distillation column may be operated under such conditions that two liquid layers are present on the top few plates of the column.

In the lower part of the column, vapors ascend and contact liquid descending from the feed plate towards the base of the column, and this tends to vaporize all of the volatile components present in the liquid. This stripping effect occurs repeatedly as the liquid descends from plate to plate, so that the liquid which reaches the bottom plate has an extremely low concentration of components which have a lower affinity for water than does ethanol. The concentration of ethanol in the liquid tends to decrease as the liquid descends below the feed plate, due to the stripping action of ascending vapors; but as the concentration of impurities decreases, the relative concentration of ethanol tends to increase. The net result of these effects is that the concentration of ethanol in the liquid on the first few plates below the feed is substantially constant or increases somewhat, and then it decreases as the liquid descends to the bottom.

The optimum requirements for the feed depend upon the concentration of impurities relative to ethanol, the total concentration of ethanol and impurities, and on the nature of the impurities. For most feeds wherein the concentration of impurities is small when compared to the ethanol, e. g., 20% or less of the weight of the ethanol, the temperature of the feed should be the same as that of the liquid on the plate in the column to which the feed is added. If the concentration of impurities is high, e. g., 5 or more times the ethanol concentration, and there is only a small amount of water in the feed, a wholly or partially vapor feed is desirable. A feed containing 95% or more of water and equal concentrations of ethanol and fermentation stock impurities should enter the column at a temperature of 80° to 100° F. below the temperature of the liquid on the plate in the column to which the feed is added; or alternatively, an internal condenser may be included at this plate to remove some of the heat.

The present invention is associated with the discovery of maximum and minimum reflux ratios or heat inputs which are critical in the extractive distillation step. If these conditions are not maintained, e. g., if the maximum reflux ratio is exceeded, the upper or the lower section of the column, or both, do not operate properly.

The optimum heat input to the dilution section of the extractive distillation column is that which will just give enough overhead vapors to correspond to the desired rate of removal of impurities as overhead. A higher heat input is required, however, for uniform or stable operation of the column, since under this optimum heat input, the column is very difficult to control.

A unique phenomenon which occurs in the extractive distillation step is the temperature pattern, which goes through a minimum value between the feed plate and the base of the column; and above the feed plate, the temperature rises sharply and goes through a maximum. The location of this maximum is determined by the operating conditions, and it may be at the top of the column, or at some point between the top and the feed plate.

The objects achieved in accordance with the invention as described herein include the provision of a process for purifying fermentation alcohol stocks from any source such as grain, fruit, potatoes, etc. to produce extremely high purity spirit ethanol having an organic impurities content of less than one gram per 100 liters; the provision of a process for producing directly from fermentation alcohol stocks a unique distillation product other than neutral spirits such as whisky, rum, cognac, brandy or other distilled alcoholic beverage product which is free of materials which are harsh, bad tasting or bad smelling; and other objects which will be apparent as details or embodiments of the invention are set forth hereinafter.

A distinction for purposes of classification herein should be made at this point between "neutral spirits" and "distillation products other than neutral spirits from alcoholic fermentation stocks." By varying the conditions of rectifying an alcohol extract, products with a high alcohol content may be recovered. Certain standards of ethanol proof of products from fermentation alcohol stocks have been prescribed to designate the product as a "neutral spirit"; for example, the distillation product from fermentation grain having a proof above about 160 is at present considered a "neutral spirit" and for purposes of the present discussion any product obtained having a lower proof than the prescribed regulation proof is considered for differentiation as a "distillation product other than neutral spirits." The purified alcohol product of the present invention may be rectified under controlled conditions to produce a final distillation product of predetermined proof in accordance with the desire to obtain either a neutral spirit or a distillation product other than a neutral spirit as just defined.

The invention will be described with reference to the accompanying drawings.

Figure 1:
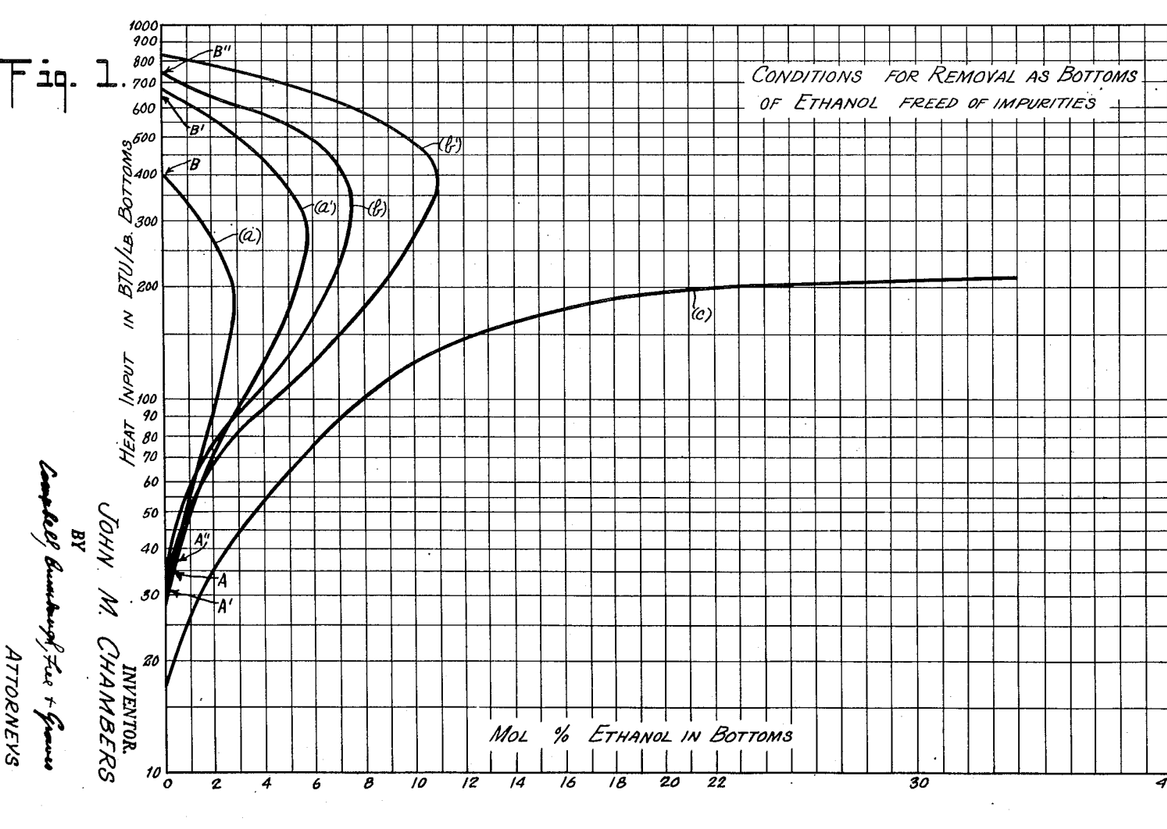
Figs. 1, 2 and 3 of which show, in graphical form, the limiting operating conditions for the extractive distillation step, and Figs. 4, 5, 6 and 7 of which show, in schematic form, various modifications of apparatus which may be used in accordance with the invention. The various usual or known devices and procedures, not shown, are intended to be included.

For convenience, the extractive distillation column is considered as being made up of two sections, a stripping section which is between the feed plate and the base, and a dilution section which is between the feed plate and the top of the column. Of the impurities present in fermentation alcohol stocks, isoamyl and the like alcohols are the most difficult to remove completely. Normal propyl alcohol, isobutyl alcohol, and similar alcohols are more readily removed. Fig. 1 is a plot of heat input into the base of the extraction column against the concentration of ethanol in the bottoms product from this column. The heat input is expressed as B. t. u. per pound of bottoms, and the ethanol concentration is expressed in mol per cent. The curves on this figure give the limiting heat input and bottoms ethanol concentration conditions for removal of typical impurities from fermentation alcohol stocks. Curve (a) defines the limiting conditions for complete removal of isoamyl alcohol and the like impurities, as well as the more readily removed impurities. If the operating conditions correspond to a point to the right of this curve, there will not be complete removal of this alcohol. However, if the conditions correspond to a point on or to the left of this curve, there will be substantially complete removal of this alcohol. Curve (a') defines the limiting conditions for partial removal of this alcohol, and all the more readily removed impurities. The degree of removal of the isoamyl alcohol under the curve (a') conditions corresponds to an enrichment of the content of this impurity obtainable with 5 to 8 actual plates, above the base of the column. Curve (b) defines the limiting conditions for substantially complete removal of the normal propyl and the isobutyl alcohol type impurities; for such removal, the operating conditions should correspond to a point on or to the left of this curve. Curve (b') similarly defines conditions for partial removal (corresponding to 5 to 8 plate enrichment) of these alcohols. Curve (c) defines the conditions for substantially complete removal of acetaldehyde type impurities, the most readily volatilized impurities; and for such removal, the operating conditions should correspond to a point above or to the left of this curve.

In addition to the necessary critical operating conditions for the stripping section of the column, there are limiting conditions for the dilution section also. For convenience, these conditions are set forth in two separate plots, Fig. 2 being for the removal as overhead of isoamyl alcohol type impurities as well as more readily removed impurities, with less than one per cent of ethanol therein; and Fig. 3 being for the removal as overhead of the normal propanol and isobutanol type and more readily removed impurities, with less than one per cent of ethanol therein. Each of these figures is a plot of the reflux ratio at the top plate to the dilution ratio at this plate; i. e., the last body of liquid contacted by ascending vapors before passing to a condenser. The reflux ratio is defined as the total mols per hour of liquid descending from the top plate of the dilution section divided by the total mols per hour of vapor which ascends to this plate. The dilution ratio is defined as the total mols per hour of impurities removed from the condenser as distillate divided by the total mols per hour of dilution water introduced on the top plate. For convenience, the dilution ratio scale is enlarged below the 0.005 reading.

Figure 2:
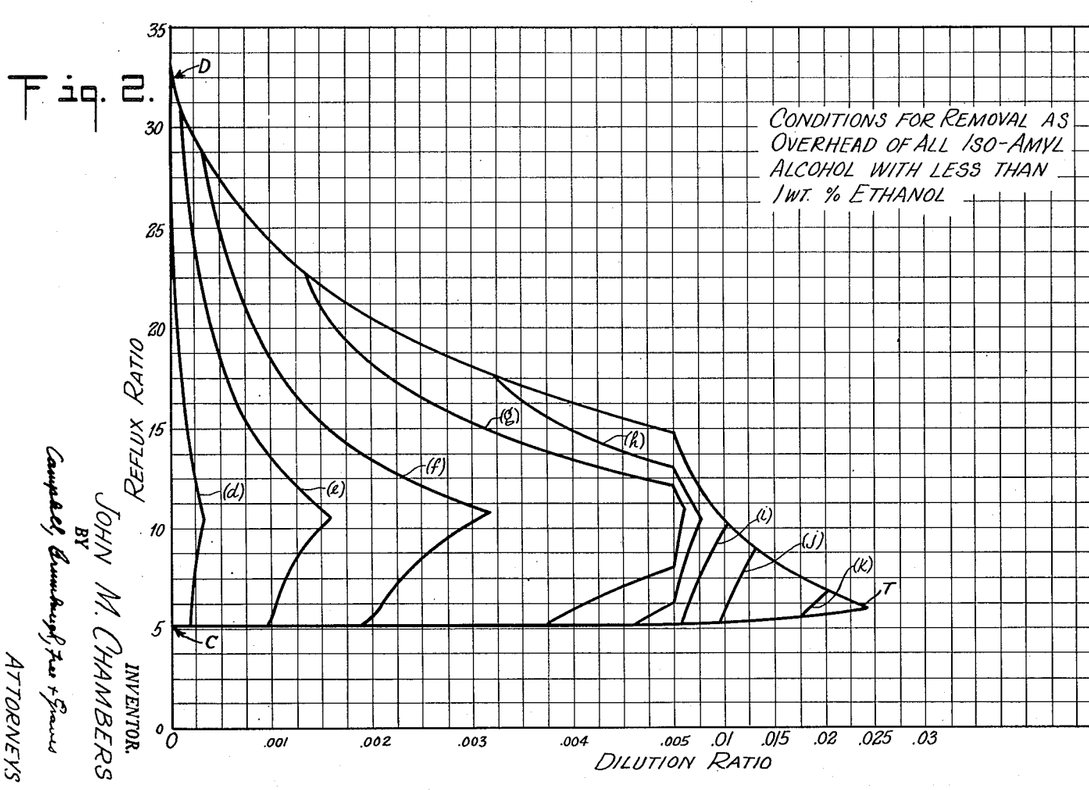

Fig. 2 contains a family of curves in an envelope curve which defines the operating conditions in the dilution section of the column for substantially complete removal of the isoamyl type and more readily removed impurities, for a series of feed plate compositions containing different amounts of total volatile impurities per 100 liters of liquid on the feed plate, as follows:

| Curve | Minimum Grams Total Impurities per 100 liters liquid on feed plate |
|---|---|
| (d) | 100 |
| (e) | 500 |
| (f) | 1,000 |
| (g) | 2,000 |
| (h) | 2,500 |
| (i) | 3,000 |
| (j) | 3,100 |
| (k) | 3,300 |

Figure 3:
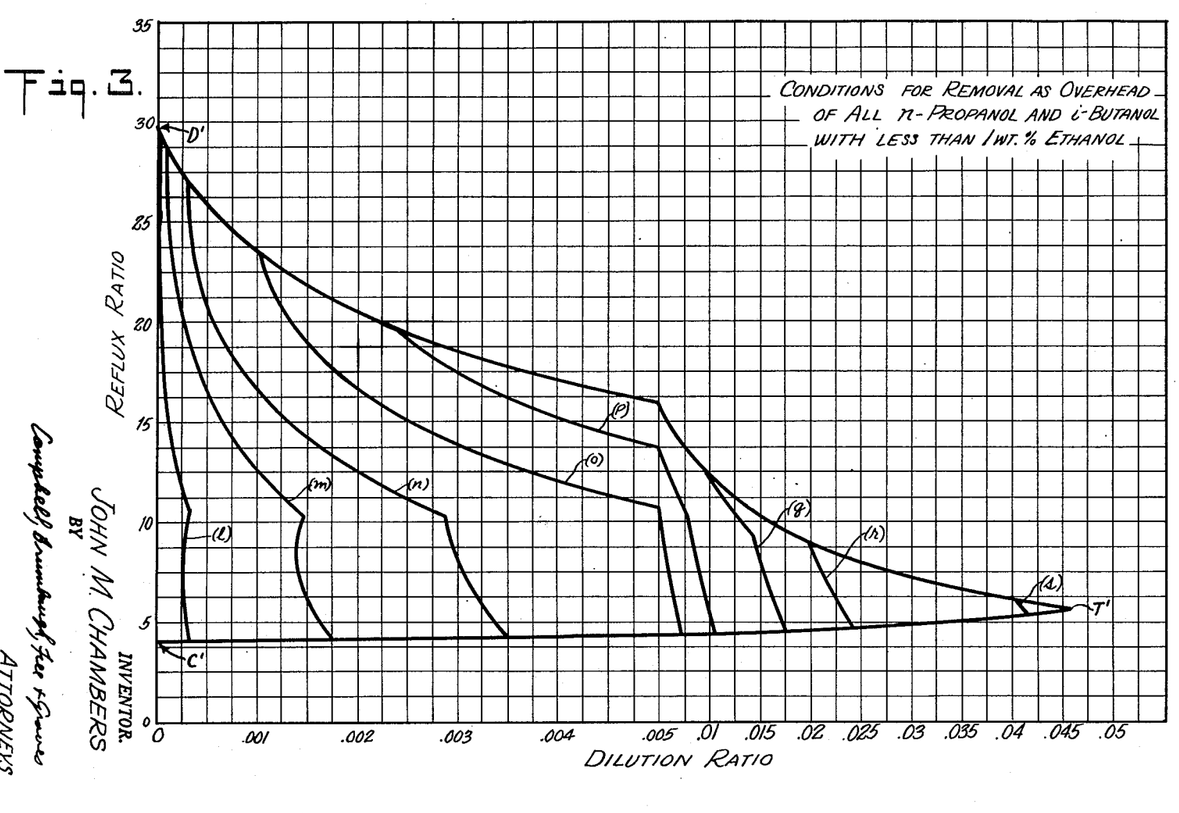

Fig. 3 contains a family of curves in an envelope curve which defines the operating conditions in the dilution section of the column for substantially complete removal of the normal propanol and isobutanol type and more readily removed impurities, for a series of feed plate compositions containing different amounts of total volatile impurities per 100 liters of liquid on the feed plate, as follows:

| Curve | Minimum Grams Total Impurities per 100 liters liquid on feed plate |
|---|---|
| (l) | 100 |
| (m) | 500 |
| (n) | 1,000 |
| (o) | 2,000 |
| (p) | 3,000 |
| (q) | 5,000 |
| (r) | 6,000 |
| (s) | 7,000 |

For substantially complete removal of each of these types of impurities, the operating conditions in the dilution section of the column must correspond to a point on or to the left of the envelope curve for the particular impurity; and the conditions in the stripping section must be such that the concentration of the total impurities in the liquid on the feed plate is defined by this point relative to the family of curves within the envelope.

Figure 4:
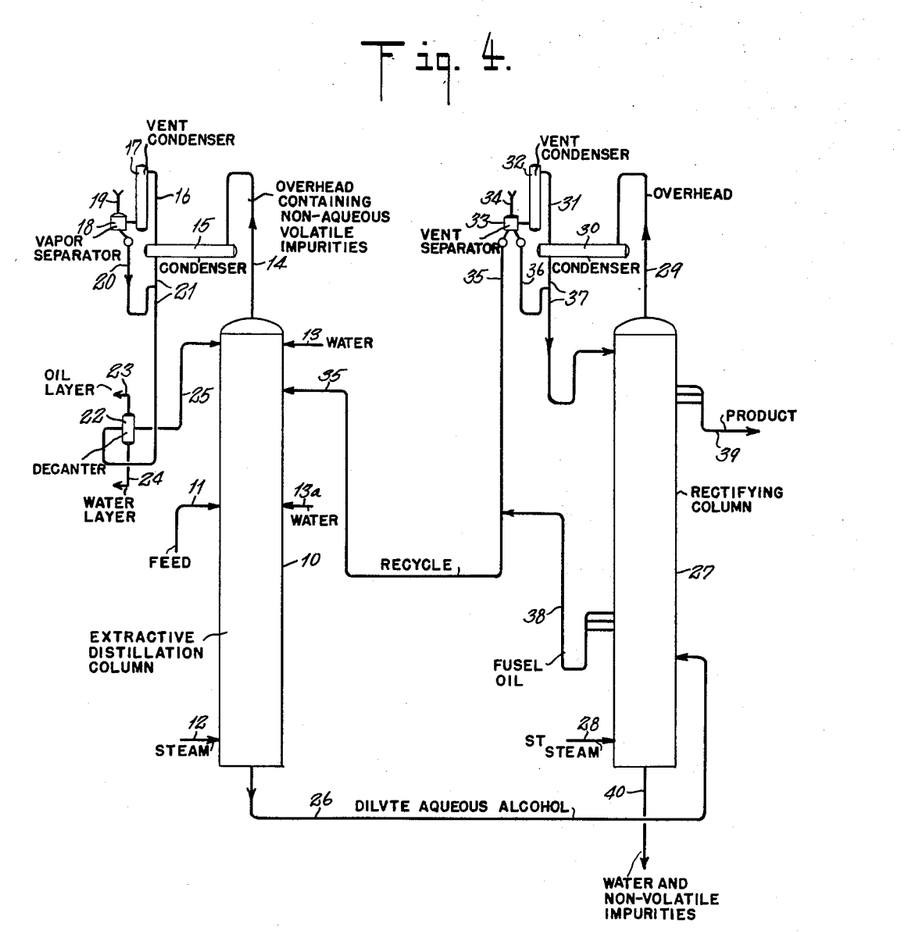

Fig. 4 is a diagrammatic illustration of one form of apparatus which is suitable for use in accordance with the invention. This apparatus includes an extractive distillation column 10, a feed inlet 11, a steam inlet 12, water inlets 13 and 13a, overhead vapor line 14, a condenser 15 with a line 16 leading to vent condenser 17, which is connected to vapor separator 18, having a vent 19, and a liquid draw-off line 20, which is connected to the liquid draw-off line 21 from condenser 15, which line leads to decanter 22, having an oil outlet line 23, and a water outlet line 24, and a recycle line 25, connected to the top of the column 10. In addition, column 10 has a liquid draw-off line 26 connecting it with the ethanol rectifying column 27. Column 27 has a steam inlet 28, an overhead vapor line 29, connecting it to condenser 30, which is connected through line 31 to vent condenser 32, which in turn is connected to vapor separator 33, which has a vent 34, and two liquid draw-off lines 35 and 36. Line 35 leads to the upper section of column 10. Line 36 is connected to the liquid draw-off line 37 from condenser 30, and this leads to the upper plate of column 27. Column 27 also has a fusel oil draw-off line 38 with optional connections at several plates just above the feed, and this line connects with line 35. The product draw-off line 39 has a group of optional connections at different plates, which are a few plates below the top plate, generally 3 to 5 plates below the top plate. Column 27 also has a liquid draw-off line 40 at the bottom thereof.

Figure 5:
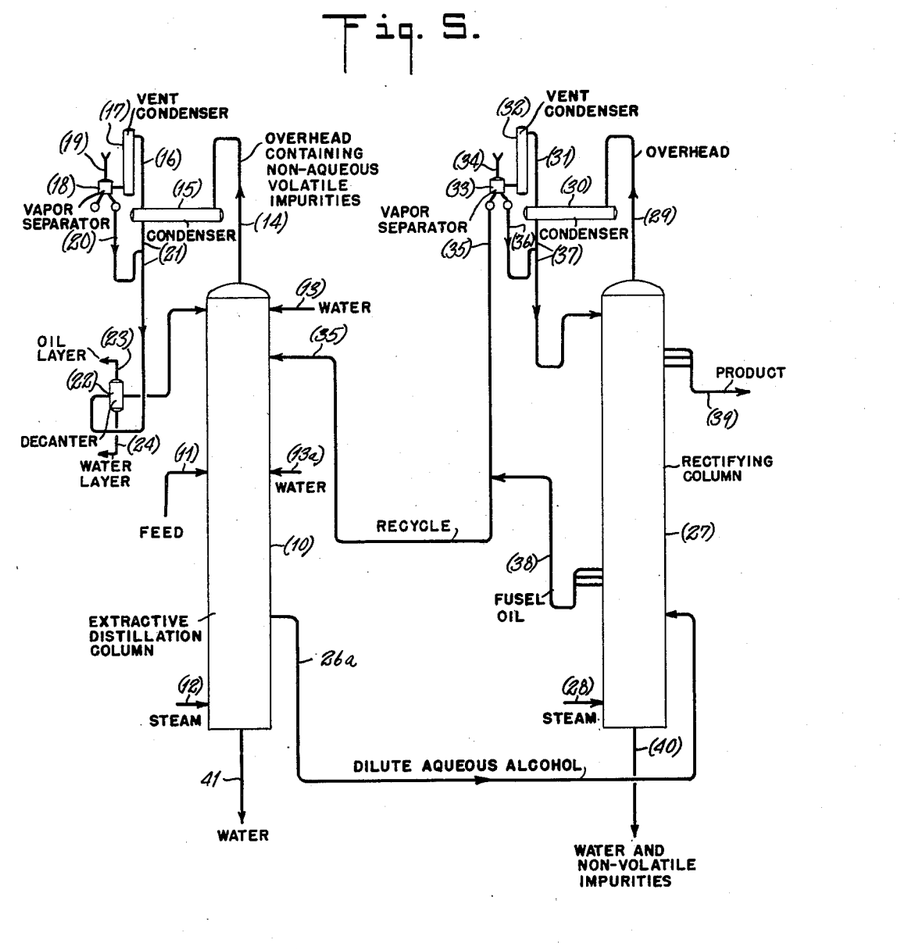

The apparatus of Fig. 5 is identical with that of Fig. 4 as to most features, but the extractive column contains additional actual plates at the lower end, e. g., below the alcohol draw-off line 26a corresponding to line 26 of Fig. 4. This column also contains an additional draw-off line 41 from the base thereof. For convenience, in this figure and the subsequent figures, the features identical with those of an earlier figure are indicated by identical numbers enclosed in parentheses.

Figure 6:
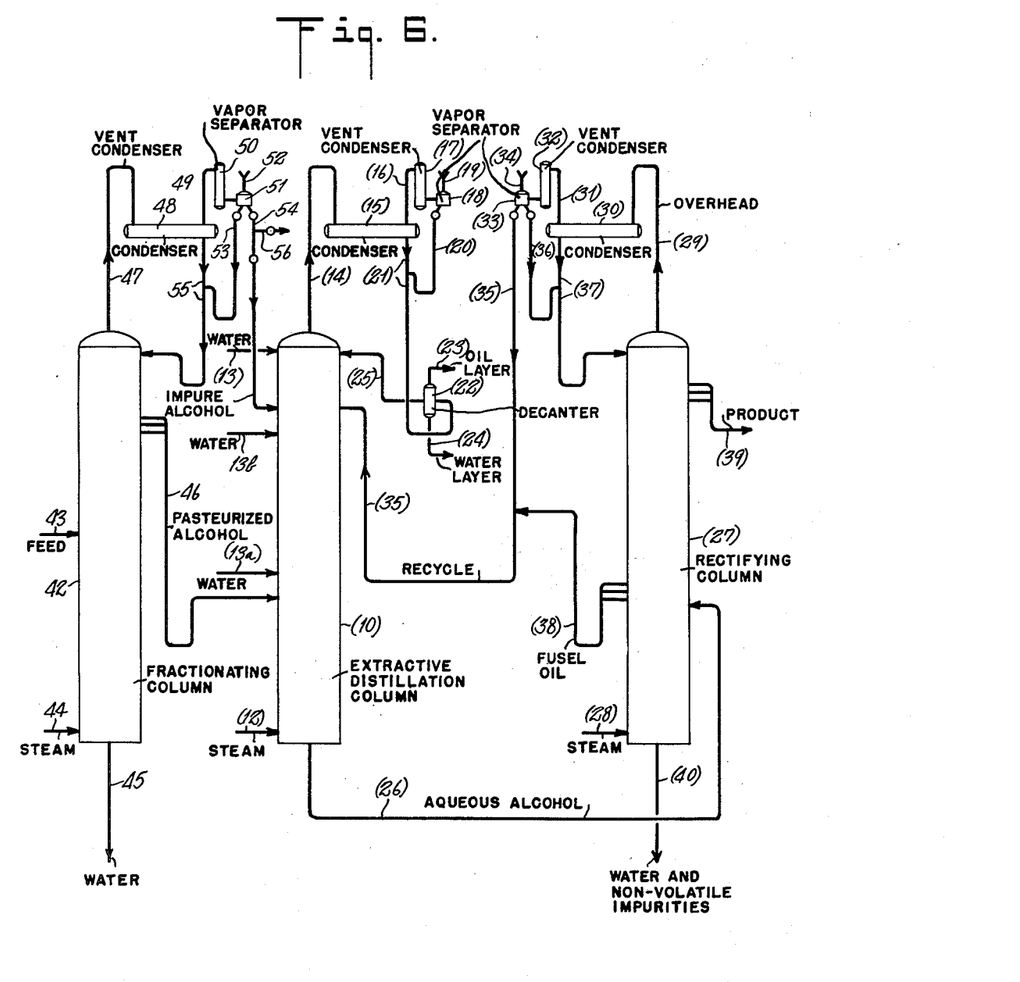

The apparatus of Fig. 6 includes most of the features of the apparatus of Fig. 4, but in addition includes a preliminary fractionating column or beer still 42, having a feed line 43, a steam inlet 44, a bottoms draw-off line 45, a wines draw-off line 46, having several optional connections near the upper end of this column, which line feeds into the extractive distillation column. In addition, column 42 has a vapor line 47, connected to condenser 48, which is connected through line 49 to vent condenser 50, which is connected to vapor separator 51, having a vent 52 and having two liquid draw-off lines 53 and 54. Line 53 connects with liquid draw-off line 55 from condenser 48, and leads to the top of column 42. Line 54 leads to the upper section of the extractive distillation column through a valved connection; and in addition, has a valved take-off line 56. The extractive distillation column has an additional water inlet 13b.

Figure 7:
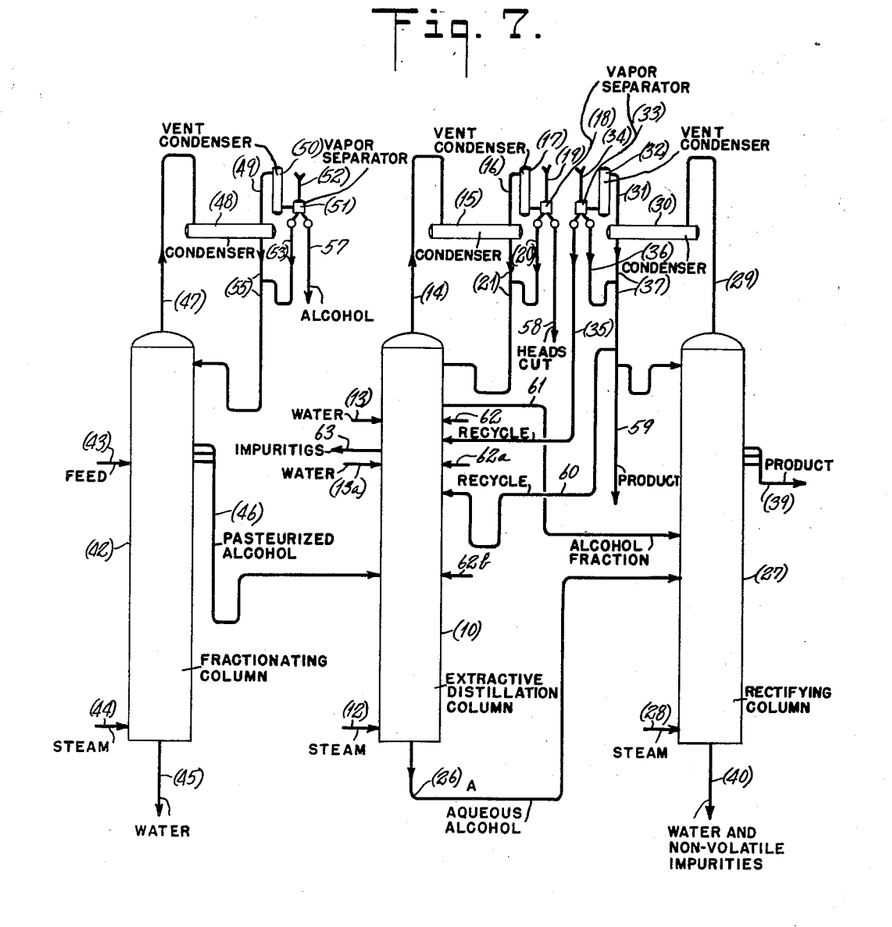

The apparatus of Fig. 7 is somewhat similar to that of Fig. 6, but the line 57 corresponding to line 54, does not connect to the extractive distillation column. In addition, it has a draw-off line 58 from the vapor separator connected with the top of the extractive distillation column. It also has a take-off line 59, connected to the liquid draw-off line corresponding to line 37 of Fig. 4, connected to the condenser above the rectifying column, and another line 60, connected thereto, which leads to the extractive distillation column. A line 61 passes from the upper section of the extractive distillation column to near the middle of the rectifying column. There is no fusel oil draw-off line from the rectifying column. Several additional steam inlets 62, 62a and 62b are provided for the extractive distillation column, and an undesirable impurities draw-off line 63 is provided intermediate the two draw-off lines.

In the operation of the process, the feed introduced into the extractive distillation column is separated into an overhead impurities fraction containing the non-aqueous volatile impurities, and a bottoms consisting of diulte aqueous ethanol (at least 1% and preferably at least 2% ethanol). It is important that the concentration of the ethanol in the bottoms be below about 2.2% by weight, in order that the non-aqueous volatile impurities be removed in the extractive distillation column. In an alternative procedure, the bottoms may contain some of the amyl alcohol type impurities, which are readily removed in the rectifying column. The bottoms from the extractive distillation column is fed into the rectifying column several plates above the base. The alcohol is concentrated therein, and the water and non-volatile impurities are removed as bottoms. The final alcohol product is removed from a point a few plates from the top of the rectifying column, about 3 to 5 plates from the top. A part of the overhead distillate fraction from the rectifying column is recycled to the rectifying column, and the remainder is sent back to the extractive distillation column, at a point near the top thereof. A fusel oil fraction may be removed from the rectifying column at a point a few plates above the feed plate, and recycled to the upper section of the extractive distillation column along with a heads fraction which is removed from the rectifying column.

In order to facilitate a clear understanding of the invention, the following specific embodiment is described in detail for an operation in a Fig. 4 type apparatus.

EXAMPLE 1

[Fermented mash feed (16.5 proof). Extractive distillation column operation for complete removal of impurities. Feed temperature, 90° F. Extractive distillation column material balance.]

|  | Feed | | Oil Layer Product, lbs. | Dilution Water (input) mols. |
|---|---|---|---|---|
|  | lbs. | mols. | | |
| Ethanol | 100.00 | 2.1700 | .01 | |
| Volatile Impurities: | | | | |
| Aldehydes | .08 | .0018 | .04 | |
| Light Esters | .18 | .0022 | .12 | |
| Heavy Esters | .06 | .0005 | .06 | |
| Light Fusel Oil | .30 | .0040 | .30 | |
| Amyl Alcohols | .80 | .0091 | .80 | |
| (Total) | (1.42) | (.0176) | (1.32) | |
| Water | 1,513.58 | 84.1000 | .12 | 7 |
| Solids | 85.00 | | | |
| Total | 1,700.00 | 86.2876 | 1.45 | 7 |

|  | Bottoms | | Steam (input) | |
|---|---|---|---|---|
|  | lbs. | mols. | lbs. | mols. |
| Ethanol | 100.00 | 2.17 | | |
| Aldehydes | | .0008 | | |
| Light Esters | | .0009 | | |
| Heavy Esters | | .0001 | | |
| Light Fusel Oil | | .0003 | | |
| Amyl Alcohols | | .002 | | |
| Water | 1,879 | 104.4 | 240 | 13.3 |
| Total, exclusive of solids | 1,979 | 106.57 | 240 | 13.3 |
| Solids | 85 | | | |
| Total | 2,064.0041 | 106.57 | 240 | 13.3 |

If the feed is preheated to a higher temperature, more dilution water would have to be used, or alternatively, a condenser would have to be included above the feed plate to remove excess vapor or heat. If a condenser is included above the feed plate, or if the feed is at a lower temperature, more steam can be introduced at the base of the column, or the amount of dilution water can be reduced. If the feed is high or low wines, faints or heads (e. g., 100 or 180 proof), with the same heat input, a larger amount of dilution water would have to be used to give the desired ethanol concentration in the bottoms; and the conditions existing within the extractive distillation column would be similar to those described above.

In the above example, the steam is introduced directly as open steam. If closed steam were used, the bottoms would not be diluted with the 240 pounds of steam used, and for the same heat input, somewhat better stripping conditions would prevail in the stripping section of the column.

The fermented mash feed contains a large amount of carbon dioxide, and this serves to carry out of the vent condenser about one-half of the total aldehydes and about one-fourth to one-third of the very light esters present in the feed.

In order to insure adequate removal of the aldehydes, it is desirable to withdraw a small water layer (through line 24 of Fig. 4) from the overhead stream recycled to the column.

Operating conditions

Dilution (upper) section of the column:
  Pressure _______________________ 760 mm.
  Temperature ___________________ 185° F.
Stripping (bottom) section of the column:
  Bottoms take-off _______ 2.04 mol% ethanol.
  Feed plate _____________ 6.3% ethanol feed.
  Pressure ______________ 900 mm. Hg.
  Temperature ___________ 209.6° F.

At a heat input of 117.5 B. t. u./lb. bottoms exclusive of solids, a point to the left of curve (a) of Fig. 1, for 2.04 mol per cent ethanol, the heat required is 117.5×1979 (total bottoms exclusive of solids) and this equals 233,300 B. t. u., or 13.3 mols of steam.

The reflux ratio at the base of the column is 106.57 (mols bottoms) divided by the steam input 13.3 mols, which equals 8.

Sensible heat of
  the bottoms = 2064×(209.6°−194° F.) = 32,300 B. t. u.
Sensible heat of
  the feed = 1700×(194°−90° F.) = 177,000

Total _________________________________ 209,300

The latent heat above the feed plate is the heat input to the base (233,300 B. t. u.) minus the above total sensible heats (209,300 B. t. u.) and this equals 24,000 B. t. u. The sensible heat of the overflow from the top plate is $$8.4 \times 18 \times (194° - 185° F.)$$

which equals 1360 B. t. u.

The latent heat of the top plate is the latent heat above the feed plate (24,000 B. t. u.) minus the sensible heat of the overflow from the top plate (1360 B. t. u.) and this equals 22,640 B. t. u. which equals 1.3 mols of vapor.

The sensible heat for the dilution water at 100° F. is 126×(185°−100° F.), which equals 10,700 B. t. u.

The latent heat of the overhead is 22,640 B. t. u. (latent heat to the top plate) minus 10,700 B. t. u. (sensible heat of the dilution water), which equals 11,940 B. t. u.

The reflux ratio at the top plate is 8.4 (mols liquid overflow) divided by 1.3 (mols vapor ascending to this plate), and this equals 6.39, or about 6.

Referring to Fig. 2, for a reflux ratio to the top plate of 6, the amount of dilution water is 5×1.37 (mols vapor), which equals 6.85, or about 7 mols/hr.

The dilution ratio is .0176 (mol/hr. of impurities removed in the distillate) divided by 7 (mols/hr. of dilution water fed to the top plate), and this equals .00252.

When fermented mash is used as feed stock, the bottoms from the rectifying column is not preferred for use as dilution water. However, if the feed consists of fermentation alcohol solutions other than mash, part of the bottoms from the rectifying column may be used for part or all of the dilution water introduced into the extractive distillation column (through lines 13 and 13a).

Rectifying column operation

The steam input into the rectifying column should be as near as practical to the minimum necessary to insure the removal of the substantially non-volatile, water-soluble impurities and acids with the water at the base of the rectifying column. A heads cut of about 3% by weight of the final ethanol product, and a fusel oil recycle stream of about 3% by weight of the final ethanol product are recycled from the rectifying column to the extractive distillation column, through lines 35 and 38. The final spirits alcohol product is remarkably pure on an organoleptic analysis basis, and the total non-aqueous impurities content is not more than one gram per 100 liters of product.

If the above heads cut and fusel oil cut portions are not recycled, the product contains about 5 grams total non-aqueous impurities per 100 liters, but is remarkably pure on an organoleptic basis.

The following example illustrates an embodiment of the invention wherein the extractive distillation column is operated to separate only the impurities which are difficult to separate from ethanol in the rectifying column, and the feed to the rectifying column contains a heavy fusel oil as well as aqueous ethanol.

EXAMPLE 2

[Fermented mash feed (16.5 proof). Extractive distillation column operation for removal of only the (light fusel oil) impurities difficult to separate from ethanol in the rectifying column. Feed temperature, 90° F. Extractive distillation column material balance.]

| | Feed, lbs. | Oil Layer Product, lbs. | Heads Recycle, lbs. | Fusel Oil Recycle, lbs. |
|---|---|---|---|---|
| Ethanol | 100.00 | .01 | 3.0 | 2.5 |
| Volatile Impurities: | | | | |
| Aldehydes | .08 | .04 | .00075 | |
| Light Esters | .18 | .12 | .0006 | |
| Heavy Esters | .06 | .06 | | .0001 |
| Light fusel oil | .30 | .30 | | .0001 |
| Amyl Alcohols | .80 | .80 | | 1.0499 |
| (Total) | (1.42) | (1.32) | (.00135) | (1.0501) |
| Water | 1,513.58 | .12 | .22 | 1.5 |
| Solids | 85.00 | | | |
| Total | 1,700.00 | 1.45 | 3.22135 | 5.0501 |

| | Bottoms, lbs. | Steam | | Dilution Water | |
|---|---|---|---|---|---|
| | | lbs. | mols. | lbs. | mols. |
| Ethanol | 105.5 | | | | |
| Aldehydes | .0008 | | | | |
| Light Esters | .0009 | | | | |
| Heavy Esters | .0001 | | | | |
| Light Fusel Oil | .0003 | | | | |
| Amyl Alcohols | 1.05 | | | | |
| Water | 1,819.68 | 178.5 | 9.91 | 126 | 7 |
| Solids | 85 | | | | |
| Total | 2,011.2321 | 178.5 | 9.91 | 126 | 7 |

Referring to Fig. 1, at a heat input of 90 B. t. u. per pound of bottoms, the heat input is $$\frac{1746 \times 90}{(970-90)} = 178.5 \text{ lbs.} = 9.9 \text{ mols of steam}$$

The bottoms take-off contains 2.25 mols per cent ethanol. The operating conditions in the dilution section of the column are the same as in Example 1. For the stripping section of the column, the pressure is 900 mm. and the temperature is 208° F.

In this procedure, it is necessary to recycle from the rectifying column a heads cut fraction of at least about 3% of the weight of the final ethanol product and a fusel oil fraction of about 6 to 12% of the weight of the final ethanol product to an upper plate of the extractive distillation column. The final product obtained is of comparable quality to that of Example 1.

The procedure of this example may be varied in a similar manner to that described in connection with Example 1.

In one embodiment of the invention, the procedure of this example is varied to that the ethanol is withdrawn from the rectifying column at a lower proof, e. g., less than or about 160 proof, and this product is a unique type of whisky. This whisky product is free of the harsh, bad tasting or bad smelling materials, which undesirable materials are removed in the extractive distillation step.

For the production of this unique whisky product the operating conditions in the stripping section of the extractive distillation column correspond to a point which is to the right of curve (a) and on or to the left of curve (a'). A relatively heavy bodied whisky is obtained by operating under conditions corresponding to points on or near curve (a'), whereas lighter bodied whisky products are obtained by operating under conditions corresponding to points nearer to curve (a).

Highly purified spirit products are obtained by operating the stripping section of the column under conditions corresponding to a point on or to the left of curve (a), and these products have very little alcoholic beverage character, regardless of proof.

The extractive distillation column referred to in Fig. 4 may contain about 50 actual plates, e. g., perforated plates, bubble cap plates, or the equivalent thereof. In the apparatus of Fig. 5, this column may contain about 10 additional plates at the bottom. The additional plates permit removal of purified aqueous ethanol at a higher concentration, e. g., up to about 20 weight per cent. For an Example 1 type operation, the feed to the rectifying column contains about 6% ethanol, instead of only about 2% for a similar operation using the apparatus of Fig. 4. This is reflected in substantial steam economy in the rectifying step. All ethanol is stripped in the additional lower section of the Fig. 5 extractive distillation column. The aqueous draw-off from the bottom of the rectifying column through line 41 of Fig. 5 may be used as the dilution agent in the extractive distillation column, as discussed above. In the rectifying column, the plates between the steam inlet and the aqueous alcohol feed provide for additional cleanup of heavy impurities, and this is especially desirable for the production of an alcoholic distillation product other than neutral spirits if the bottoms from this column are discarded or passed to a beer still.

In operating the process of the invention with the apparatus of Fig. 6, a so-called pasteurized alcohol product from the beer still at 100 to 160 proof is fed into the extractive distillation column at or somewhat below the middle thereof. In addition, an overhead distillate fraction containing about 10 wt. per cent of the total ethanol at 160 to 190 proof containing aldehydes and light esters is introduced near the top of the extractive distillation column. Most of the dilution water is introduced through line 13b, which is below the overheads cut feed. This facilitates removal of aldehydes, and results in steam economy. Furthermore, this apparatus and procedure permit a desirable great flexibility in operating procedure for whisky production.

The products obtained in the modified operations using this apparatus are comparable to those described above.

The apparatus of Fig. 7 is a modified version of the apparatus of Fig. 6 and is especially desirable for producing an alcoholic distillation product other than neutral spirits. Using this Fig. 7 apparatus, a high proof alcohol fraction containing about 1 to 3 wt. per cent of the total ethanol and rich in aldehydes is taken off as a heads cut from the beer still, through line 57. A heads cut fraction of about 1 to 5% of the volume of the final distillation product and rich in aldehydes and very light esters is removed from the extractive distillation column, through line 58. A part of the heads cut from the vapor separator above the rectifying column is recycled to the extractive distillation column, as in the Fig. 6 type operation. In addition, a part of the overhead condensate from the rectifying column is recycled to the extractive distillation column at a lower point than the above recycled fraction. A fraction may be removed from near the top of the extractive distillation column through line 61 and introduced into the rectifying column at a few plates above the feed thereto of bottoms from the extractive distillation column. A fraction of undesirable impurities may be removed from the upper part of the extractive distillation column through line 63. Additional steam inlets into the extractive distillation column 62, 62a and 62b are provided. The final product may be taken off through line 59 or from a point several plates below the top plate of the rectifying column, as described above. Or the product may be a blend of materials taken off from both these lines. The whole arrangement permits great flexibility of operation, such that a wide variety of selection of blends of materials may be included in the alcoholic beverage product. The arrangement of recycle lines, draw-off lines and steam inlet lines in the extractive distillation column permits one to selectively pass material upwardly (vaporize) or downwardly (as liquid) in various sub-sections of the extractive distillation column. In addition, the proportions of the various recycled or cross-feed fractions may be varied within wide limits.

The product obtained from this apparatus is of the unique distillation product type as described above.

The foregoing descriptions are for purposes of illustration only, and variations and modifications may be made therein within the scope of the appended claims.

I claim:

1. The process of purifying a fermentation alcohol stock to prepare improved high-purity spirit ethanol which comprises fractionally distilling said stock in the presence of a substantial concentration of an aqueous dilution agent in a distillation column, regulating conditions as hereinafter described in the sections of the column above and below the feed such that the column constitutes a dilution-extraction section and a stripping section respectively, removing the impurities as overhead from the column and removing a dilute aqueous ethanol fraction containing at least 1 mol per cent ethanol as bottoms from the column, maintaining conditions in the base and lower section of said distillation column such that the heat input in B. t. u. per pound of the bottoms product withdrawn is within the area defined by the curve A"bB" and the zero ethanol bottoms concentration axis on the diagram represented by Figure 1 and maintaining in the upper section of said distillation column a dilution ratio and a reflux ratio on the top plate thereof within the area defined by the outer envelope curve C'T'D' and the zero dilution ratio axis on the diagram represented by Fig. 3, rectifying in a second column said dilute bottoms product withdrawn from said distillation column and withdrawing as overhead of the rectification said high-purity ethanol.

2. The process of purifying a fermentation alcohol stock to prepare an improved distillation product which comprises fractionally distilling said stock in the presence of a substantial concentration of an aqueous dilution agent in a distillation column, regulating conditions as hereinafter described in the sections of the column above and below the feed such that the column constitutes a dilution-extraction section and a stripping section respectively, removing impurities as overhead from the column and removing a dilute aqueous ethanol fraction containing at least 1 mol per cent ethanol as bottoms from the column, maintaining conditions in the base and lower section of said distillation column such that the heat input in B. t. u. per pound of the bottoms product withdrawn is within the area defined by the curve A'aB' and the zero ethanol concentration axis on the diagram represented by Figure 1 and maintaining in the upper section of said distillation column a dilution ratio and a reflux ratio on the top plate thereof within the area defined by the outer envelope curve CTD and the zero dilution ratio axis on the diagram represented by Figure 2, rectifying in a second column said bottoms product withdrawn from said distillation column and withdrawing as overhead product of the rectification said improved distillation product at a predetermined proof for the ethanol content thereof.

3. The process of claim 2 wherein the bottoms fraction is rectified to a whisky product of up to about 160 proof.

4. The process of purifying a fermentation alcohol stock to prepare an improved distillation product which comprises fractionally distilling said stock in the presence of a substantial concentration of an aqueous dilution agent in a distillation column, regulating conditions as hereinafter described in the sections of the column above and below the feed such that the column constitutes a dilution-extraction section and a stripping section respectively, removing impurities as overhead from the column and removing a dilute aqueous ethanol fraction containing at least 1 mol per cent ethanol as bottoms from the column, maintaining conditions in the base and lower section of said distillation column such that the heat input in B. t. u. per pound of the bottoms product withdrawn is within the area defined by the curve AaB and the zero ethanol concentration axis on the diagram represented by Figure 1 and maintaining in the upper section of said distillation column a dilution ratio and a reflux ratio on the top plate thereof within the area defined by the outer envelope curve CTD and the zero dilution ratio axis on the diagram represented by Figure 2, rectifying in a second column said dilute bottoms product withdrawn from said distillation column and withdrawing as overhead of the rectification said improved distillation product.

5. A process for purifying a fermentation alcohol stock to prepare an improved distillation product which comprises fractionally distilling said stock in the presence of a substantial concentration of an aqueous dilution agent in a distillation column, regulating conditions as hereinafter described in the sections of the column above and below the feed such that the column constitutes a dilution-extraction section and a stripping section respectively, removing a portion of the impurities fraction as overhead from the column and removing a dilute aqueous ethanol fraction containing at least 1 mol per cent ethanol and the remaining impurities as bottoms from the column, maintaining conditions in the base and lower section of said distillation column such that the heat input in B. t. u. per pound of the bottoms product withdrawn is within the area defined by the curves A$a$B and A'$a$'B' on the diagram represented by Figure 1 and maintaining in the upper section of said distillation column a dilution ratio and a reflux ratio on the top plate thereof within the area defined by the outer envelope curve CTD of the diagram represented by Figure 2 and the outer envelope curve C'T'D' of the diagram represented by Figure 3 plotted as they are upon the same coordinate axes, rectifying in a second column said bottoms product withdrawn from said distillation column and withdrawing as overhead product of the rectification said improved distillation product at a predetermined proof for the ethanol content thereof.

6. A process for purifying a fermentation alcohol stock to prepare improved high-purity ethanol which comprises fractionally distilling said stock in the presence of a substantial concentration of an aqueous dilution agent in a distillation column, regulating conditions as hereinafter described in the sections of the column above and below the feed such that the column constitutes a dilution-extraction section and a stripping section respectively, removing the impurities as overhead from the column and removing a dilute aqueous ethanol fraction from the column at about ten plates from the bottom thereof, maintaining conditions in the base or lower section of said distillation column such that the heat input in B. t. u. per pound is within the area defined by the curve A$a$B and the zero ethanol bottoms concentration axis in the diagram represented by Figure 1 and maintaining in the upper section of said distillation column a dilution ratio and a reflux ratio on the top plate thereof within the area defined by the outer envelope curve C'T'D' and the zero dilution ratio axis in the diagram represented by Figure 3, rectifying in a second column said dilute aqueous ethanol fraction withdrawn from said distillation column and withdrawing as overhead of the rectification said high-purity ethanol.

JOHN M. CHAMBERS.

References Cited in the file of this patent

UNITED STATES PATENTS

| Number | Name | Date |
|---|---|---|
| 996,328 | Guillaume | June 27, 1911 |
| 1,929,901 | Ricard et al. | Oct. 10, 1933 |
| 2,080,111 | Bump | May 11, 1937 |
| 2,148,846 | Von Retza et al. | Feb. 28, 1939 |
| 2,290,442 | Metzl | July 21, 1943 |
| 2,379,110 | Souders | June 26, 1945 |
| 2,551,593 | Gilliland et al. | May 8, 1951 |
| 2,551,626 | Morrell et al. | May 8, 1951 |

FOREIGN PATENTS

| Number | Country | Date |
|---|---|---|
| 573,001 | Great Britain | Nov. 1, 1945 |